Oct. 27, 1970 L. D. FEISEL 3,537,079

FERROELECTRIC STORAGE DEVICE

Filed Nov. 29, 1967 2 Sheets-Sheet 1

INVENTOR.
Lyle D. Feisel
BY Yuter & Spiecens
ATTORNEYS

Oct. 27, 1970 L. D. FEISEL 3,537,079

FERROELECTRIC STORAGE DEVICE

Filed Nov. 29, 1967 2 Sheets-Sheet 2

MEMORY 50

United States Patent Office 3,537,079
Patented Oct. 27, 1970

3,537,079

FERROELECTRIC STORAGE DEVICE

Lyle D. Feisel, Rapid City, S. Dak., assignor to Research Corporation, New York, N.Y., a non-profit corporation of New York Filed Nov. 29, 1967, Ser. No. 686,532
Int. Cl. G11c *5/06, 7/02, 11/22*
U.S. Cl. 340—173.2 9 Claims

ABSTRACT OF THE DISCLOSURE

A storage cell utilizes a slab of ferroelectric material. A first pair of read-write electrodes is disposed on opposed faces of the slab. A second pair of sense electrodes is also disposed on the opposed faces of the slab. When a voltage pulse of one polarity is applied across the first pair of electrodes, the ferroelectric material is polarized in one direction. When a voltage pulse of another polarity is applied across the first pair of electrodes the ferroelectric material is polarized in an opposite direction. After the pulse is removed there is a residual polarization. Thus, a binary digit can be stored in the cell as represented by the residual polarization. Whenever the direction of polarization changes, current will flow through an external circuit connected between the second pair of electrodes. Thus, the stored binary digit can be read out of the cell by sensing for a flow of current when the cell is driven to a given direction of polarization. In addition, the elementary storage cell configuration of electrodes is multiplied to yield a multicell storage device.

Figure 1:
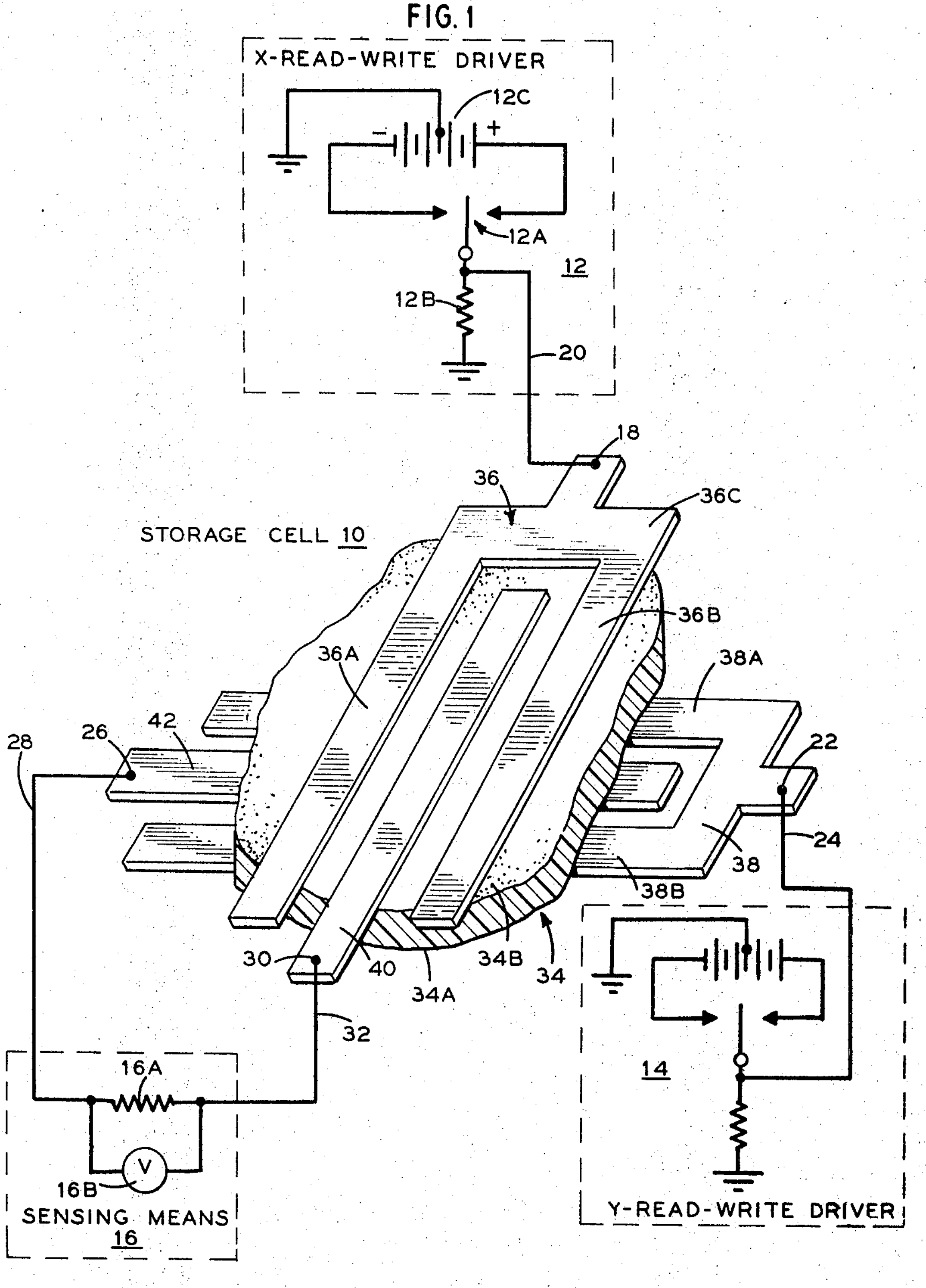

This invention pertains to electrical storage devices and more particularly to storage devices employing ferroelectric material.

Ferroelectric storage cells have been known for some time. Essentially, such a cell includes a slab of ferroelectric material such as a metal titanate and a pair of electrodes on opposed faces of the slab to form a capacitor. The ferroelectric material, when subjected to an electric field resulting from a voltage across the electrodes, exhibits a hysteresis loop characteristic between the electrostatic polarizing force and the polarization of the material. This hysteresis loop is similar to that exhibited by the B–H hysteresis loop of ferromagnetic materials. The operation of such a capacitor for information storage purposes consists in applying a voltage across the electrodes on opposite faces of the slab of material which drives the portion of the material between the electrodes to one of two stable polarization states on the hysteresis curve. Upon the removal of the voltage, the ferroelectric material between the electrodes remains in its latter polarization state. To read out the stored information, it is necessary to apply a reverse voltage across the electrodes.

This concept has been expanded to provide two dimensional memory arrays wherein a first set of parallel conductors are disposed on one face of the slab and a second set is disposed, orthogonal to the first set, on the opposite face of the slab. Each projective intersection of the conductors forms a storage cell. An individual cell may be selected by applying to a conductor on one face of the slab a voltage pulse which is less than that normally required to switch the state of the material, and to a conductor on the other face a voltage pulse of similar amplitude. These voltage pulses must be greater than one-half the magnitude of a voltage pulse which will switch the state of the ferroelectric material. In this manner, a binary bit is written in only one storage cell, that is, the storage cell which is subjected to a voltage pulse that has twice the amplitude of a single voltage pulse.

At the end of the pulse, only that cell where the two conductors projectively intersect is in the polarization state representing say, binary one. The other cells remain at binary zero, the opposite polarization state.

Since these cells are basically two-terminal devices, readout of the information is very difficult. In particular, resort must be taken to measure the current which flows in the selected conductors at the instant of selection and to sense whether or not this current has an increment due to the reversal of the selected cell. Because there is not a perfect "squareness" to the hysteresis loop, the total current flowing through the unselected cells on the selected conductor may be much larger than the switching increment of current. Accordingly, it is very difficult to operate a multicell storage device by using voltage pulse coincidences.

In addition, since the input to the device takes the form of a voltage pulse, and the output of the device is a current pulse, the device is neither uniquely current-associated as with a ferromagnetic memory or voltage-associated. Therefore, compatibility problems arise.

It is a general object of the invention to provide a ferroelectric memory or storage cell which has isolation between its input circuits and its output circuits.

It is another object of the invention to provide a ferroelectric storage device which does not require large currents for its operation.

It is a further object of the invention to satisfy the above objects with a ferroelectric storage device that is well suited to construction of a multicell matrix type memory.

Briefly, the invention contemplates a storage cell which comprises a slab of ferroelectric material. The slab has first and second opposed faces. There is a pair of input electrodes, each electrode being disposed on a different one of the opposed faces. The input electrodes are adapted to receive electric voltage pulses which establish an electric field in the region of the ferroelectric material between the electrodes. A second pair of electrodes, output electrodes, are also disposed on the opposed faces of the slab of ferroelectric material, one electrode on each of the faces. The second pair of electrodes is adapted to be connected to a current sensing means whereby current flows between the second pair of electrodes whenever the electric field passing through the slab of ferroelectric material changes direction.

It should be noted that by using a first pair of input electrodes and a second pair of output electrodes the input and output circuits are isolated from each other.

Other objects, the features and advantages of the invention will be apparent from the following detailed description when read in conjunction with the accompanying drawings which show by way of example and not limitation, the now preferred embodiment of the invention.

Figure 2:
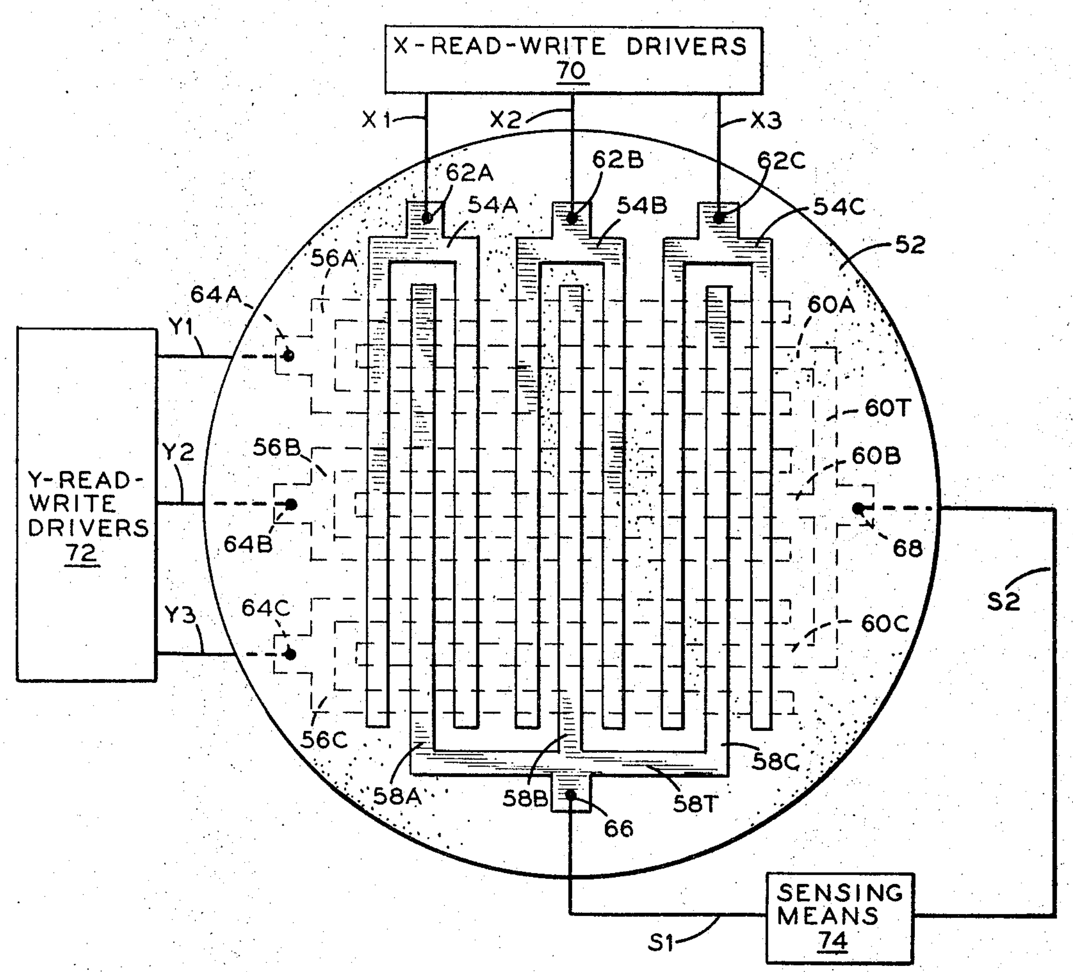

In the drawings:

FIG. 1 is a perspective view of a ferroelectric storage cell in accordance with the invention; and FIG. 2 is a plan view of a multicell ferroelectric storage device, including a block diagram representing the associated electronic circuitry.

Referring now to FIG. 1, there is shown a storage cell 10 which is accessed by virtue of X-read-write driver 12 and Y-read-write driver 14 and whose contents is sensed by sensing means 16. Input terminal 18 of storage cell 10 is connected to X-read-write driver 12 via line 20 and input terminal 22 of storage cell 10 is connected via line 24 to Y-read-write driver 14. The output terminals 26 and 30 are respectively connected via lines 28 and 32 to sensing means 16.

Storage cell 10 comprises a slab 34 of ferroelectric material. Typical ferroelectric materials are barium titanate or lead zirconate-lead titanate composition. Such materials have the desired squareness in their hysteresis loops. Input electrodes 36 and 38 are disposed on opposite faces of the slab 34. Output electrodes 40 and 42 are similarly disposed on opposite faces of slab 34. Preferably, the electrodes are conducting films that can be printed on the slab 34 acting as a substrate. The printing process is not critical and can be any of the available printed circuit techniques. Terminals 18, 22, 26 and 30 can be silver paste, while the lines 20, 24, 28, and 32 are copper wires affixed to the electrodes via the silver paste. Other techniques, such as welding, ultrasonic bonding, etc. can be used.

Preferably, the input electrodes 36 and 38 comprise bifurcated elements, for example, electrode 36 comprises the bifurcated elements 36A and 36B connected by a bridging member 36C to the terminal 18. The output electrodes 40 and 42 are disposed between the bifurcated elements. In particular, electrode 40 is interleaved between the bifurcated elements 36A and 36B of electrode 36. Furthermore, the axes of the electrodes 36 and 40 on one face 34B of slab 34 are orthogonal to the axes of the electrodes 38 and 42 on the other face 34A of the slab 34. Such a bifurcated configuration more sharply defines the region of the slab which constitutes the storage cell and enhances a coupling of the output electrodes to the storage cell region.

The operation of the storage device will now be described. In the description it will be assumed that the ferroelectric in the slab 34 will only switch polarization when a voltage equal to or greater than 2V volts is applied across it. If a voltage less than 2V volts is applied across the slab, it will remain in its previous state of polarization and more particularly if a voltage equal only to V volts is present, then no polarity reversal of polarization will occur. Furthermore, it will be assumed that when the polarization in the slab is from face 34B to face 34A a binary one is stored in the cell. A polarization in the opposite direction signifies the storing of a binary zero. In order to write a binary one into the cell, a voltage pulse of +V volts from X-read-write drive 12 is applied to electrode 36 and at the same time a voltage pulse of −V volts from Y-read-write driver 14 is applied to electrode 38. Accordingly, during the presence of the pulses there is a downwardly directed electric field between the electrodes and a downwardly directed polarization will be established in slab 34. Since the slab 34 is a ferroelectric material, some polarization is retained after the end of the input pulse. Due to coupling within the slab 34, a remanent polarization is established throughout its volume, corresponding roughly to the area of the cell within the projective intersection of the electrodes 36 and 38 and particularly, in the region of the projective intersection of the electrodes 40 and 42. This results in an induced charge on these output electrodes 40 and 42. Conversely, the reversal of polarity of the applied pulses on electrodes 36 and 38 results in a polarization directed from face 34A to face 34B corresponding to a binary zero. In order to read out the contents of the storage cell 10, it is necessary to write a binary zero into the cell. If the storage cell 10 was previously in the binary one state, that is, with the polarization being directed from face 34B to face 34A, then the writing of the binary zero will cause the polarization to reverse, that is, the direction of polarization will be from face 34A to face 34B. During this reversal, the induced charges on the electrodes 40 and 42 also reverse. During the reversal of the induced charges, a current flows in the circuit including electrodes 40 and 42, lines 28 and 32, and sensing means 16. Sensing means 16 detects this current flow and indicates a binary one. If however, the cell was storing a binary zero, then there is no reversal of charge and no current flows through the sensing means.

The remaining elements for the electronic circuitry associated with storage cell 10 will now be described. X-read-write driver 12 is shown schematically as comprising a single-pole, double-throw switch 12A. The movable contact of the switch is connected via resistor 12B to ground. In addition, the movable contact is connected to the line 20. One fixed contact of the switch 12A is connected to the negative terminal of a battery 12C while the positive terminal of the battery is connected to the other fixed contact of the switch. The battery 12C can develop a voltage of 2V volts across its output terminals. However, the center tap point of the battery is returned to ground. Therefore, either terminal will develop a voltage having a magnitude of V volts with respect to ground. The Y-read-write driver 14 is identical in all respects to the X-read-write driver 12 except for its connection to line 24 and therefore will not be described.

Sensing means 16 can comprise a resistor 16A connected in series with the lines 28 and 32, and a voltmeter 16B connected across resistor 16A. Although the read-write drivers 12 and 14 have been shown as single-pole, double-throw switches connected to batteries, it should be apparent to those skilled in the art that in actual equipment these drivers would be electronically operated voltage sources employing transistor switches or the like. Similarly, while sensing means 16 has been shown as the combination of a resistor and a voltmeter, in practical apparatus current or voltage sensing amplifiers would normally be employed.

In FIG. 2, there is shown a memory 50 which comprises a 3 x 3 array of storage cells. In particular, the memory comprises slab 52 of ferroelectric material. On the top face of slab 52 are printed the input electrodes 54A, 54B and 54C, while on the bottom face are printed the input electrodes 56A, 56B and 56C. These input electrodes are similar to the previously described input electrodes of storage cell 10. The only difference being that the bifurcated elements extend across the faces of the slab 52 so that nine projective intersections of these electrodes are obtained. Each of these intersections defines a separate storage cell. For example, the region associated with the intersection of electrodes 54A and 56A defines a storage cell.

On the top face of slab 52 are the output electrodes 58A, 58B and 58C, while on the bottom face are the output electrodes 60A, 60B and 60C. It should be noted that each of the output electrodes is interleaved between one of the bifurcated pair of elements of an input electrode. In addition, each of the output electrodes 58 of the top face are connected in common by a conductor 58T which is also a portion of the printed circuit. Similarly, the printed element 60T connects the output electrodes 60A, 60B and 60C on the bottom face of slab 52.

The terminals 62A, 62B and 62C of the input electrodes 54A, 54B and 54C are connected via lines X1, X2 and X3 respectively to the X-read-write drivers 70. Similarly, the terminals 64A, 64B and 64C of the input electrodes 56A, 56B and 56C are connected via lines Y1, Y2 and Y3 respectively to the Y-read-write drivers 72. In addition, the common terminal 66 of the output electrodes 58A, 58B and 58C is connected via line S1 to the sensing means 74 while the common terminal 68 of the output electrodes 60A, 60B and 60C are connected via line S2 to the sensing means 74.

The X-read-write drivers 70 comprise three drivers similar to the read-write drivers 12 and 14 of FIG. 1. Each one of these three drivers is connected to one of the lines X1, X2 or X3. Similarly, the Y-read-write drivers 72 are the same as the previously described read-write drivers 12 and 14, each one of these drivers is connected to one of the lines Y1, Y2 or Y3. The sensing means 74 is similar to the previously described sensing means 16.

The operation of memory 50 will now be described. Assume a binary one is to be recorded in the storage cell encompassed by the projective intersection of input electrodes 54A and 56A. In this case, the X and Y read-write drivers associated with lines X1 and Y1 are energized. Accordingly, a voltage pulse having a magnitude of 2V volts appears across these two electrodes and the ferroelectric material at the intersection is polarized as previously described. However, at any other intersection of any pair of the input electrodes a voltage pulse having a magnitude of at most V volts is present. For example, in the region of the slab between the electrodes 54B and 56A this voltage pulse only has a magnitude of V volts since only electrode 56A is energized and electrode 54B is not energized. Similarly, for the region around the intersection of electrodes 54A and 56B. In that case, only the electrode 54A has a voltage while electrode 56B is not energized. In any event, it should be noted that changes in polarization can occur where there are coincidences of the voltage pulses.

Interrogation of the memory is the same as previously described; that is, a binary zero is written into the selected cell. For example, to interrogate the cell associated with the intersection of electrodes 54A and 56A it is necessary to now energize the lines Y1 and X1 with voltage pulses which will result in the recording of a binary zero. If the binary one had previously been recorded, then the polarization will change polarity as will the charge on the electrodes.

Current will flow in a circuit including electrode 58A, terminal 66, line S1, sensing means 74, line S2, terminal 68 and electrode 60A. It should be noted that the remaining cells do not receive a voltage pulse sufficient to change the polarity of polarization and therefore only the contents of the selected storage cell is read out.

Thus, there has been shown an improved ferroelectric memory which by utilization of separate input and output electrodes, provides the desired isolation and in fact does not require the sensing of incremental currents during the readout operation, but senses directly the flow of current resulting from changes in polarization.

In a working embodiment of the device, a 3 x 3 matrix was constructed wherein the input and output electrodes were a pattern "printed" by vacuum depositing aluminum on a substrate comprising a disc of lead zirconate-lead titanate ceramic. The substrate was one and one-half inches in diameter and had a thickness of 0.030 inch. The voltage pulses had a minimum of V equal to 15 volts. This resulted in a 10 to 1 ratio in the amplitude of the current sensing of a binary one to that of a binary zero. Switching times in the order of tens of microseconds were obtained.

While only one embodiment of the invention was shown and described in detail, there will now be obvious to those skilled in the art many modifications and variations which satisfy many or all of the objects of the invention but which cannot depart from the spirit thereof as defined in the appended claims.

What is claimed is:

1. A storage cell comprising a slab of ferroelectric material, said slab of ferroelectrical material having first and second opposed faces, a first pair of electrodes, each of the electrodes of said first pair being disposed on a different one of said opposed faces, bidirectional voltage pulse generating means connected to said first pair of electrodes for transmitting electric voltage pulses of selected polarity whereby an electric field is established between said first pair of electrodes and passing through said slab of ferroelectric material to polarize the material in a given direction in accordance with the polarity of a received electric voltage pulse, and a second pair of electrodes, each of the electrodes of said second pair being disposed on one of said opposed faces, current sensing means, and means for connecting said second pair of electrodes to only said current sensing means whereby current flows between said second pair of electrodes whenever the polarization of said slab of ferroelectric material changes direction.

2. The storage cell of claim 1 wherein each electrode of said first pair of electrodes comprises a bifurcated pair of laminar elements and each electrode of said second pair of electrodes is a laminar element disposed between the laminar elements of the bifurcated pair of laminar elements.

3. The storage cell of claim 1 wherein the electrodes on the first face of said slab of ferroelectric material have an axis which projectively intersects the axis of the electrodes on the second face of said slab of ferroelectric material.

4. A multicell storage device comprising a slab of ferroelectric material, said slab of ferroelectric material having first and second opposed faces, a first plurality of electrodes disposed on said first face, a second plurality of electrodes disposed on said second face, each electrode of said first plurality of electrodes cooperating with a group of the electrodes of said second plurality of electrodes to define a group of different specific regions of said slab of ferroelectric material as a group of different storage cells, a third plurality of electrodes disposed on said first face, each electrode of said third plurality of electrodes being disposed operatively adjacent at least one of said storage cells, and a fourth plurality of electrodes disposed on said second face, each electrode of said fourth plurality being disposed operatively adjacent at least one of said storage cells.

5. The multicell storage device of claim 4 further comprising a plurality of first controllably switchable sources of voltage pulses, each connected to one of said first plurality of electrodes, a plurality of second controllably switchable sources of voltage pulses, each connected to one of said second plurality of electrodes, a current sensing means including first and second terminals, means for connecting said third plurality of electrodes in common with the first terminal of said current sensing means and means for connecting said fourth plurality of electrodes in common with the second terminal of said current sensing means.

6. The multicell storage device of claim 4 wherein each electrode of at least one of said first and second pluralities of electrodes comprises a bifurcated pair of laminar elements, and each electrode of at least one of said third and fourth plurality of electrodes is a laminar element disposed between a different one of the laminar elements of one of the bifurcated pairs of elements.

7. The multicell storage device of claim 4 wherein each of the electrodes of said first and second pluralities of electrodes is an elongated laminar element and the axes of the electrodes of said first plurality of electrodes projectively intersect the axes of the electrodes of said second plurality of electrodes.

8. The multicell storage device of claim 4 wherein each electrode of said first and second plurality of electrodes comprises a bifurcated pair of elongated laminar elements, the axes of the elongated laminar elements of said first plurality of electrodes being orthogonal to the axes of the elongated laminar elements of said second plurality of electrodes, each of said electrodes of said third and fourth pluralities of electrodes being elongated laminar elements, each of the elongated laminar elements of said third plurality of electrodes being disposed between the elongated laminar elements of a different pair of bifurcated elongated laminar elements of said first plurality of electrodes, each of the elongated laminar elements of said fourth plurality of electrodes being disposed between the elongated laminar elements of a different pair of bifurcated elongated laminar elements of said second plurality of electrodes, first laminar conductor means disposed on the first face of said slab of ferroelectric material connecting each of the elongated laminar elements of said third plurality of electrodes in common, and second laminar conductor means disposed on the second face of said slab of ferroelectric material connecting each of the elongated laminar elements of said fourth plurality of electrodes in common.

9. The multicell storage device of claim 8 further comprising a plurality of first controllably switchable sources of voltage pulses, each of said first controllably switchable sources of voltage pulses being connected to one of said first plurality of electrodes, a plurality of second controllably switchable sources of voltage pulses, each of said second controllably switchable sources of voltage pulses being connected to one of said second plurality of electrodes, a current sensing means including first and second terminals, means for connecting said first laminar conducting means to the first terminal of said current sensing means and means for connecting said second laminar conducting means to the second terminal of said current sensing means.

References Cited

UNITED STATES PATENTS

| | | | |
|---|---|---|---|
| 3,037,196 | 5/1962 | Brennemann | 340—173.2 |
| 3,142,044 | 7/1964 | Kaufman et al. | 340—173.2 |
| 3,223,985 | 12/1965 | Bittmann et al. | 340—174 |
| 3,448,437 | 6/1969 | Barnett | 340—173.2 |

TERRELL W. FEARS, Primary Examiner

J. F. BREIMAYER, Assistant Examiner